(12) United States Patent
Takagi et al.

(10) Patent No.: US 7,008,991 B2
(45) Date of Patent: Mar. 7, 2006

(54) THERMOPLASTIC RESIN COMPOSITION

(75) Inventors: Kiyoji Takagi, Hiratsuka (JP); Makoto Nakamura, Hiratsuka (JP); Kouji Iwaki, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 190 days.

(21) Appl. No.: 10/198,190

(22) Filed: Jul. 17, 2002

(65) Prior Publication Data

US 2003/0130405 A1    Jul. 10, 2003

(30) Foreign Application Priority Data

Jul. 18, 2001  (JP) .............................. 2001-218778
Jul. 18, 2001  (JP) .............................. 2001-218779

(51) Int. Cl.
C08K 3/04      (2006.01)
H01B 1/24     (2006.01)

(52) U.S. Cl. ..................... 524/496; 524/495; 252/511
(58) Field of Classification Search ............... 524/495, 524/496; 174/35 MS, 126.2; 252/511
See application file for complete search history.

(56) References Cited

U.S. PATENT DOCUMENTS

| | | | |
|---|---|---|---|
| 4,749,981 A |   | 6/1988 | Yui et al. ..................... 338/225 |
| 5,098,610 A | * | 3/1992 | Okamura et al. ............ 252/511 |
| 5,449,722 A | * | 9/1995 | Nishida et al. ............... 525/98 |
| 5,484,838 A |   | 1/1996 | Helms et al. ................. 524/496 |
| 6,441,084 B1 | * | 8/2002 | Lee et al. ..................... 524/495 |
| 6,455,771 B1 | * | 9/2002 | Han et al. ............... 174/35 MS |

FOREIGN PATENT DOCUMENTS

| | | |
|---|---|---|
| FR | 2 469 429 | 5/1981 |
| WO | WO 00/46815 | 8/2000 |
| WO | WO 00/68299 | 11/2000 |

OTHER PUBLICATIONS

Patent Abstracts of Japan, Publication No. 02-201811 (1990).
Patent Abstracts of Japan, Publication No. 10-204305 (1990).
Patent Abstracts of Japan, vol. 1998, No. 13, Publication No. 10204305, Publication Date: Aug. 4, 1998.
Patent Abstracts of Japan, vol. 014, No. 483, Publication No. 02201811, Publication Date: Aug. 10, 1990.
Patent Abstracts of Japan, vol. 1999, No. 11, Publication No. 11163589, Publication Date: Jun. 18, 1999.
Database WPI, Section Ch, Week 199043, Publication No. XP-002245025 (1990).

* cited by examiner

*Primary Examiner*—Tae H. Yoon
(74) *Attorney, Agent, or Firm*—David G. Conlin; Christine C. O'Day; Edwards Angell Palmer & Dodge LLP

(57) ABSTRACT

The present invention relates to a thermoplastic resin composition comprising two different thermoplastic resins (component A and component B), conductive carbon black (component C), and conductive carbon black having a larger specific surface area than that of component C or hollow carbon fibril (component D), said thermoplastic resin composition having an island-and-sea micro structure constituted by component A and component B, component C existing mostly in the island phase, and
component D existing mostly in the sea phase.

6 Claims, No Drawings

THERMOPLASTIC RESIN COMPOSITION

BACKGROUND OF THE INVENTION

The present invention relates to a thermoplastic resin composition. More particularly, it relates to a thermoplastic resin composition having excellent mechanical strength and heat resistance as well as fine electrical properties such as conductivity and antistatic properties.

It is widely practiced in the art to incorporate an electro-conductive material in an electrically insulating thermoplastic resin to provide it with specific properties such as conductivity and antistatic properties, and a variety of conductive materials have been proposed for this purpose. Among the generally used conductive materials are ionic surfactants, nonionic surfactants, organic compounds having polyethylene glycol units or ionic functional groups, such as high polymeric antistats, and inorganic materials such as carbon black, carbon fiber, metallic fiber, metallic powder and metal oxides. In particular, carbon black is used for obtaining high conductivity at a small mixing rate. Further, in order to obtain a high-conductivity blended resin composition, a method has been proposed in which carbon black is compounded in a high concentration or a high density or homogeneously in the resin constituting the sea phase (matrix phase or continuous phase) in the micro structure of a resin blend.

These resin compositions, however, although provided with conductivity, are forced to sacrifice some of the innate advantageous properties of thermoplastic resins, such as molding workability, mechanical strength (particularly toughness) and surface appearance. On the other hand, with the advancement of miniaturization, integration and precision of OA equipment and electronic devices, the request from the market for the minimized tendency of the conductive resin-made electric and electronic parts to collect dust and dirt is becoming more and more serious every year. This request is particularly strong on IC chips used for semiconductors, wafers and interior components of hard discs used for computers, for which it is essential to afford antistatic properties to perfectly prevent collection of dust and dirt.

For such purposes, conductive resin materials, for example, alloys mainly composed of polycarbonate resin (such as polycarbonate resin and ABS resin blend) and alloys mainly composed of polyphenylene ether-based resin (such as polyphenylene ether resin and polystyrene resin blend) are used. These conductive resin materials, however, have the disadvantage of being lowered in mechanical strength and fluidity as a large amount of carbon black must be blended for providing high conductivity to the molding resin material.

For coating of automobile parts, there is generally used "static coating" in which a conductive resin molded part to be coated is electrified and a coating material charged with the opposite polarity is sprayed to the said part. This coating method makes use of the attractive force generated between the molded part surface and the coating material by charging them with opposite polarities to strengthen adhesion of the coating material to the part surface. Polycarbonate resin and polyester resin blends and polyphenylene resin and polyamide resin blends are prevalently used for automobile exterior trim parts and outer plate parts. However, these molding resin materials also have the problem of reduced mechanical strength and fluidity because of mixing of a conductive material for providing conductivity to the resin materials.

As a molding resin material freed of the above problems, Japanese Patent Application Laid-Open (KOKAI) No. 2-201811 discloses a resin material having its conductivity improved by the addition of a small amount of carbon black by selectively containing it in the sea phase in the micro structure of a resin blend, but this resin material is still not cleared of the problem of reduced molding workability. Japanese Patent Application Laid-Open (KOKAI) No. 10-204305 teaches that molding workability and surface appearance can be improved by selectively containing a conductive material such as carbon black in the island phase, i.e. discontinuous phase in the micro structure of a resin blend, but the composition is still unsatisfactory in volume resistivity.

SUMMARY OF THE INVENTION

The first object of the present invention is to provide a thermoplastic resin composition improved in electrical properties such as electroconductivity and antistatic properties with no compromise in the essential properties of thermoplastic resins such as mechanical strength and fluidity.

The second object of the present invention is to provide a thermoplastic resin composition with improved volume resistivity.

To attain the above aims, in an aspect of the present invention, there is provided a thermoplastic resin composition comprising two different thermoplastic resins (component A and component B), conductive carbon black (component C), and conductive carbon black having a larger specific surface area than that of component C or hollow carbon fibril (component D), said thermoplastic resin composition having an island-and-sea micro structure constituted by component A and component B, component C existing mostly in the island phase, and component D existing mostly in the sea phase.

DETAILED DESCRIPTION OF THE INVENTION

In the thermoplastic resin composition according to the present invention, two different thermoplastic resins (component A and component B) are used in combination. The thermoplastic resins usable as component A are principally those classified as amorphous thermoplastic resins, and the thermoplastic resins usable as component B are principally those designated as crystalline thermoplastic resins. It is possible to use a combination of different amorphous thermoplastic resins or a combination of different crystalline thermoplastic resins.

In the present invention, the term "amorphous thermoplastic resin" is used to refer to those thermoplastic resins whose heat of fusion as measured by a differential scanning calorimeter, for example, Perkin-Elmer's DSC-II is less than 1 calorie/gram, and the term "crystalline thermoplastic resin" refers to those thermoplastic resins whose heat of fusion is not less than 1 calorie/gram. Differential scanning calorimeter is capable of measuring glass transition temperature, melting point and heat of fusion of thermoplastic resins. Heat of fusion can be determined by heating the sample to a temperature above the expected melting point, then cooling the sample at a rate of 10° C./min till reaching 20° C., leaving the sample as it is for about one minute, and then again heating the sample at a rate of 10° C. The heat of fusion adopted in the present invention is the value measured by the heating-cooling cycles becomes constant within the range of experimental errors.

The term "thermoplastic resin" is used in the present invention to refer to those resins which are softened when heated and can be deformed or fluidized by applying an external force. Examples of the amorphous thermoplastic resins are aromatic vinyl compound-based resins, polycarbonate resins, polyphenylene ether resins, polysulfone resins, polyolefinic elastomers, polystyrene-based elastomers, and amorphous polyamides. These resins may be used either singly or as a mixture of two of them. Examples of the crystalline thermoplastic resins are polyolefinic resins, polyester resins, polyacetal resins, polyphenylene sulfide resins, and polyamide resins. These resins may be used singly or as a mixture of two of them.

The aromatic vinyl compound-based resins mentioned as an example of the amorphous thermoplastic resins are the resins (polymers) derived from the compounds having the molecular structural of the following formula [I]:

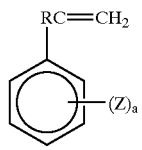

[I]

wherein R is a hydrogen atom, an alkyl group or a halogen atom, Z is a hydrogen atom, an alkyl group, a halogen atom or a vinyl group and "a" is an integer of 1 to 5.

Examples of the resins having the structure of the formula [I] include polystyrenes, rubber-reinforced polystyrenes, styrene-acrylonitrile copolymer, acrylonitrile-butadiene-styrene copolymer (ABS resin), styrene-maleic anhydride copolymer, and styrene-maleimide copolymer.

The polycarbonates mentioned as another example of the amorphous thermoplastic resins include aromatic polycarbonates, aliphatic polycarbonates, and aromatic-aliphatic polycarbonates. Of these resins, aromatic polycarbonates are preferred. Such aromatic polycarbonates are the thermoplastic aromatic polycarbonate polymers or copolymers which may be branched and which can be obtained by reacting an aromatic hydroxyl compound or a mixture of the said compound and a small quantity of a polyhydroxyl compound with phosgene or a diester of carbonic acid. The preparation method of these aromatic polycarbonates is not specifically defined in the present invention; it is possible to use the conventional well-known methods such as phosgene method (interfacial polymerization method) and melting method (ester exchange method). The aromatic polycarbonate resins produced by the melting method may have been adjusted in the amount of terminal OH group.

As the reactant aromatic dihydroxyl compound, 2,2-bis (4-hydroxyphenyl)propane (=bisphenol A), tetramethylbisphenol A, bis(4-hydroxyphenyl)-P-diisopropylbenzene, hydroquinone, resorcinol, 4,4-dihydroxydiphenyl and the like can be used, bisphenol A being preferred. For the purpose of further improving flame retardancy of this resin, a compound prepared by bonding one or more units of tetraalkylsulfonium sulphonate to the said aromatic dihydroxyl compound, and/or a polymer or oligomer containing phenolic OH groups at both terminals and having a siloxane structure, may be allowed to coexist in small quantities.

For obtaining a branched aromatic polycarbonate resin, polyhydroxyl compounds such as fluoroglucine, 4,6-dimethyl-2,4,6-tri(4-hydroxyphenyl)heptene-2,4,6-dimethyl-2, 4,6-tri(4-hydroxyphenyl)heptane, 2,6-dimethyl-2,4,6-tri(4-hydroxyphenyl)heptene-3, 1,3,5-tri(4-hydroxyphenyl) benzene, and 1,1,1-tri(4-hydroxyphenyl)ethane, or 3,3-bis (4-hydroxyaryl)oxyindole (=isatinbisphenol), 5-chloroisatin, 5,7-dichloroisatin, 5-bromoisatin or the like may be used as partial substitute of the said aromatic dihydroxyl compound. The amount of these compounds used is preferably in the range of 0.01 to 10 mol %, more preferably 0.1 to 2 mol %.

Preferred examples of the aromatic polycarbonate resins are polycarbonate resins derived from 2,2-bis(4-hydroxyphenyl)propane, and polycarbonate copolymers derived from 2,2-bis(4-hydroxyphenyl)propane and other amoratic dihydroxyl compounds. A polymer or an oligomer having a siloxane structure may be additionally copolymerized therewith for further elevating flame retardancy of this resin. The aromatic polycarbonate resin may be a mixture of two or more resins with different compositions.

Molecular weight of the aromatic polycarbonate resin is preferably 13,000 to 30,000 in terms of viscosity-average molecular weight calculated from the solution viscosity measured at 25° C. using methylene chloride as solvent. When the viscosity-average molecular weight of this resin is less than 13,000, the molded article obtained from the resin composition may be unsatisfactory in mechanical strength, and when the viscosity-average molecular weight exceeds 30,000, the obtained resin composition may be poor in moldability. The more preferred range of viscosity-average molecular weight is from 15,000 to 27,000, even more preferably from 17,000 to 24,000.

For modifying molecular weight of the polycarbonate resin, a monovalent aromatic hydroxyl compound is used as a starting material. Exemplary of such monovalent aromatic hydroxyl compounds are m- and p-methylphenol, m- and p-propylphenol, p-tert-butylphenol, and long chain alkylsubstituted p-phenol.

The polyphenylene ether resins, which are still another example of the amorphous thermoplastic resins, are the homopolymers or copolymers having the structure represented by the following formula [II]:

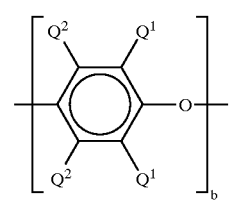

[II]

wherein $Q^1$ and $Q^2$ are each a primary or secondary alkyl group. Preferred examples of the primary alkyl groups represented by $Q^1$ and $Q^2$ are methyl, ethyl, n-propyl, n-butyl, n-amyl, isoamyl, 2-methylbutyl, n-hexyl, 2,3-dimethylbutyl, 2-, 3- or 4-methylpentyl and heptyl, and preferred examples of the secondary alkyl groups are isopropyl, sec-butyl and 1-ethylpropyl. In many cases, $Q^1$ is an alkyl or phenyl group, especially an alkyl group having 1 to 4 carbon atoms, and $Q^2$ is hydrogen atom. "b" is about not less than 10.

A preferred example of the homopolymers of polyphenylene ether is one which comprises 2,6-dimethyl-1,4-phenylene ether units, and a preferred example of the copolymers is a random copolymer comprising a combination of the above-said units and 2,3,6-trimethyl-1,4-phenylene ether units. Many preferred examples of the homopolymers and random copolymers are described in the existing patents and literature. Polyphenylene ethers containing a molecular structural portion functioning for improving molecular weight, melt viscosity and/or other properties such as impact strength are also preferred.

The polyphenylene ether used here is preferably one whose intrinsic viscosity as measured in chloroform at 30° C. is 0.2 to 0.8 dl/g. When intrinsic viscosity is less than 0.2 dl/g, the produced resin composition may lack in impact resistance, and when intrinsic viscosity exceeds 0.8 dl/g, the composition may be unsatisfactory in moldability. The preferred range of intrinsic viscosity is from 0.2 to 0.7 dl/g, especially from 0.25 to 0.6 dl/g.

The polysulfone resins, yet another example of the amorphous thermoplastic resins, are the resins having the molecular structure represented by the following formula [III]:

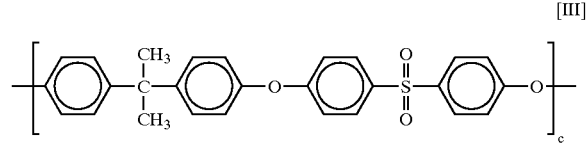

wherein "c" is about not less than 10.

The polyolefinic elastomers mentioned as an example of the thermoplastic resins usable as component A are the block copolymers comprising soft segments of EPDM or EPR and hard segments of polypropylene or polyethylene. The polystyrene-based elastomers, which are another example of component A thermoplastic resins, are the block copolymers comprising soft segments of polybutadiene or polyisoprene and hard segments of polystyrene.

The polyolefin resins cited as an example of component B thermoplastic resins include homopolymers of α-olefins, copolymers thereof, and copolymers which are mainly composed of an α-olefin (or α-olefins) and if necessary may have other unsaturated monomer(s) as a sub-component. The "copolymers" mentioned above may be of any type: block, random, graft or a composite thereof. The modified versions, such as chlorinated, sulfonated and carbonylated versions, of these olefin polymers are also usable.

Exemplary of the said α-olefins are ethylene, propylene, butene-1, pentene-1, hexene-1, heptene-1 and octene-1. Those with a carbon number of 2 to 8 are preferred because of easy availability. Examples of the said other unsaturated monomers include unsaturated organic acids such as (meth) acrylic acids, (meth)acrylic esters and maleic acid, esters of these organic acids, anhydrides thereof, and unsaturated alicyclic olefins. The polyolefins mentioned above include low-density polyethylenes, medium-density polyethylenes, high-density polyethylenes, polypropylene, polybutene, poly-4-methyl-pentene-1, propylene-ethylene block copolymer, propylene-ethylene random copolymer, and copolymers of ethylene and other copolymerizable monomers.

As the polyester resins which are another example of component B thermoplastic resins, there are, for example, thermoplastic polyester resins obtained by condensing dicarboxylic acids, lower alkyl esters thereof, acid halides or acid anhydride derivatives with glycols or divalent phenols according to a conventional method. The dicarboxylic acids may be either aromatic or aliphatic. Specifically, these dicarboxylic acids include oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalindicarboxylic acid, 2,7-naphthalindicarboxylic acid, and mixtures of these carboxylic acids.

The glycols may be either aliphatic or aromatic. Exemplary of the aliphatic glycols are $C_2$–$C_{12}$ alkylene glycols such as ethylene glycol, 1,3-propylene glycol, 1,4-butene glycol, 1,6-hexene glycol and 1,12-dodecamethylene glycol. A typical example of the aromatic glycols is p-xylene glycol. Exemplary of the divalent phenols are pyrocatechol, resorcinol, hydroquinone, and alkyl-substituted derivatives of these compounds. 1,4-cyclohexanedimethanol can be cited as other appropriate glycol for the above condensation.

As other preferred polyesters, those produced by ring-opening polymerization of lactone, such as polypivalolactone and poly(ε-captrolactone), can be mentioned. As still another preferred polyester resins, there can be mentioned those in the form of a polymer (thermoplastic liquid crystal polymer, TLCP) which forms liquid crystal in a molten state. The presently commercially available liquid crystal polyester resins which fall under this category include X7G (Eastman Kodak), Xyday (Datoco Co., Ltd), Econol (Sumitomo Chemical), and Bectra (Celanese Co., Ltd).

Among the saturated polyester resins mentioned above, those preferred to be used as component B are polyethylene terephthalate (PET), polybutyrene terephthalate (PBT), polynaphthalene terephthalate (PEN), poly(1,4-cyclohexanedimethylene terephthalate (PCT), and liquid crystal polyesters.

Examples of the polyacetal resins usable as component B thermal resin are high-molecular weight polyacetal homopolymers produced from polymerization of formaldehyde or trioxane. The acetal resins produced from formaldehyde have a high molecular weight and possess a structure represented by the following formula [IV]:

$$\text{HO}\text{-}(\text{CH}_2\text{-}\text{O}\text{-}\text{CH}_2\text{-}\text{O})_d\text{H} \qquad [\text{IV}]$$

wherein "d" is about not less than 100.

In order to enhance heat resistance and chemical resistance of the polyacetal resins, usually the terminal group is converted to ester group or ether group. These polyacetals also include polyacetal copolymers. Examples of such copolymers are the block copolymers of formaldehyde and other types of monomer or prepolymer capable of providing active hydrogen, such as alkylene glycol, polythiol, vinyl acetate-acrylic acid copolymer or reduced butadiene-acrylonitrile copolymer. Formaldehyde and trioxane can be copolymerized with other aldehydes, cyclic ethers, vinyl compounds, ketenes, cyclic carbonates, epoxides, isocyanates and ethers. Examples of these compounds are ethylene oxide, 1,3-dioxane, 1,3-dioxepene, epichlorohydrin, propylene oxide, isobutyrene oxide and styrene oxide.

The polyphenylene sulfide resins, another example of component B thermoplastic resins, are the crystalline homopolymers or copolymers containing as main structural element the repeating units represented by the following formula [V]:

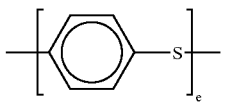
[V]

wherein "e" is about not less than 10.

Various polymerization methods are available for producing the polyphenylene sulfide resins, such as: p-dichlorobenzene is polymerized in the presence of sulfur and sodium carbonate; the said monomer is polymerized in a polar solvent in the presence of sodium sulfide, or sodium hydrosulfide and sodium hydroxide, or hydrogen sulfide and sodium hydroxide; p-chlorothiophenol is self-condensed. The most appropriate is the method in which sodium sulfide and p-chlorobenzene are reacted in an amide type solvent such as N-methylpyrrolidone or dimethylacetamide or a sulfone type solvent such as sulforan. Examples of the polyphenylene sulfide resins in the present invention are those having as main structural element the repeating units represented by the above formula [V], that is, homopolymers comprising the repeating units of the formula [V], and copolymers mainly comprising the said repeating units of the formula [V] (preferably not less than 80 mol %) and containing one or more other types of repeating units at a small proportion (preferably not more than 20 mol %).

The polyamides, still another example of component B thermoplastic resin, are those having —CONH— bond in the backbone and meltable by heating. Typical examples of such polyamides are polyamide-4, polyamide-6, polyamide-6.6, polyamide-12, polyamide-6.10, and other crystalline or amorphous polyamides containing known monomeric materials such as aromatic diamines and aromatic dicarboxylic acids. The preferred polyamides are nylon-6, nylon-6.6 and half-aromatic nylon, and these may be used in combination with amorphous polyamides.

The polyamide used in the present invention is preferably one whose relative viscosity as measured in 98% concentrated sulfuric acid at 25° C. falls in the range of 2.0 to 7.0. When its relative viscosity is less than 2.0, the produced resin composition may be low in mechanical strength, and when the relative viscosity exceeds 7.0, the composition may be poor in moldability.

The thermoplastic resin composition according to the present invention is characterized by the island-and-sea micro structure (phase separation). The "island-and-sea micro structure" referred to in the present invention signifies a micro-structure in which the islands are dispersed forming a discontinuous phase in the sea phase forming a continuous phase. This can be easily confirmed by electron microscopical examination. For example, a small piece is cut out from a pellet or molded product of the thermoplastic resin composition and sliced by an ultramicrotome (e.g. Ultracut N by Reicherd Co., Ltd.), and the surface of this ultra-thin piece is stained with ruthenium tetraoxide ($RuO_4$), osmium tetraoxide ($OsO_4$) or like material and observed under a transmission electron microscope (e.g. JEM100CX by Nippon Denshi KK). The size of the island phase is usually 0.1 to 10 μm in major diameter.

Use of a thermoplastic resin composition having such a microform makes it possible to obtain a molded article with excellent mechanical strength. In the thermoplastic resin composition according to the present invention, the thermoplastic resin used as component A comprises mostly an amorphous thermoplastic resin and constitutes the island phase in the micro structure, and the thermoplastic resin used as component B comprises mostly a crystalline thermoplastic resin and forms the sea phase in the micro structure. As for the combination of component A and component B resins, cases where the component A thermoplastic resin is a polycarbonate resin and the component B thermoplastic resin is a polyolefinic resin, and the component A thermoplastic resin is a polyphenylene ether resin and the component B thermoplastic resin is a polyamide resin are preferable.

In the thermoplastic resin composition according to the present invention, conductive carbon black (component C) exists mostly in the island phase of the micro structure constituted by component A and component B thermoplastic resins, and hollow carbon fibrils or conductive carbon black (component D) exists mostly in the sea phase. By using both component C and component D and dispersing them in the manner described above, it is possible to obtain a thermoplastic resin composition which suffers no excess reduction of fluidity and is capable of providing a molded article with excellent conductivity and antistatic properties.

The specific surface area of conductive carbon black of component C determined by BET adsorption isotherm with an $N_2$ gas is usually not more than 600 $m^2/g$. When the specific surface area of component C mostly dispersed in the island phase is more than 600 $m^2/g$, the obtained resin composition may be intolerably low in fluidity and mechanical strength. The preferred range of the specific surface area of component C is from 10 to 450 $m^2/g$, more preferably from 10 to 100 $m^2/g$. The dibutyl phthalate (DBP) oil absorption as measured according to ASTM D2414 (DBP oil absorption) is usually not more than 200 ml/100 g, preferably not more than 150 ml/100 g. An example of carbon black that can meet such a physical properly requirement is acetylene black obtained by pyrolyzing acetylene gas.

The specific surface area of component D conductive carbon black determined by BET adsorption isotherm with an $N_2$ gas is usually not less than 600 $m^2/g$. When the specific surface area of component D conductive carbon black dispersed mainly in the sea phase is less than 600 $m^2/g$, it may be unable to afford conductivity to the produced resin composition. The preferred range of the specific surface area of component D conductive carbon black is from 750 to 1,300 $m^2/g$. The DBP oil absorption of component D conductive carbon black is usually not less than 200 ml/100 g, preferably not less than 150 ml/100 g. A typical example of carbon black that meets the above property requirements is ketchen black produced by incomplete furnace combustion using crude oil as starting material.

The hollow carbon fibril of component D is essentially a columnar fibril having an outside region composed of a plurality of essentially continuous layers of regularly arranged carbon atoms and an inside hollow region, in which the respective layers and the hollow region are disposed substantially concentric to each other. Further, the regularly arranged carbon atoms in the said outside region are graphite-like, and the diameter of the said hollow region is preferably in the range of 2 to 20 nm. Such hollow carbon fibrils are described in detail in Japanese Patent Application Laid-Open (KOHYO) No. 62-500943, U.S. Pat. No. 4,663, 230, etc., and they can be produced, for instance, by a method in which, as described in the above-mentioned U.S. patent, the particles containing a transition metal such as alumina-supported iron, cobalt, nickel or the like are brought into contact with a carbon-containing gas such as carbon monoxide or hydrogen carbide at a high temperature of 850 to 1,200° C. and the pyrolytically produced carbon is grown into fiber with the transition metal as starting point. The hollow carbon fibrils usable as component D in the present invention are commercially available under the trade name of Graphite Fibril from Hyperion Catalysis International, Inc.

For the preparation of the thermoplastic resin composition according to the present invention, first component C and component D are blended and dispersed respectively in a thermoplastic resin, and then the resin containing component C and the resin containing component D are melted and mixed together. Thus, the thermoplastic resin, as explained above, comprises component A thermoplastic resin and component B thermoplastic resin, in which the two thermoplastic resins are preferably combined in such a ratio that component A thermoplastic resin will be 5 to 65 parts by weight and component B thermoplastic resin will be 95 to 35 parts by weight in 100 parts by weight of the two thermoplastic resins combined. When component A thermoplastic resin is less than 5 parts by weight and component B thermoplastic resin exceeds 95 parts by weight, the produced composition may lack in mechanical strength and moldability, and when component A thermoplastic resin exceeds 65 parts by weight and component B thermoplastic resin is less than 35 parts by weight, the produced composition tends to become low in conductivity although it depends on the content of conductive carbon black.

As for the amounts of component C and component D, they are preferably selected so that both of component C and component D will fall within the range of 0.1 to 15 parts by weight to 100 parts by weight of component A and component B combined. When the amount of component C or component D is less than 0.1 part by weight, conductivity and antistatic properties may be deteriorated, and when the amount of component C or component D exceeds 15 parts by weight, mechanical strength and moldability may be deteriorated. The amount of component C is more preferably 0.5 to 12 parts by weight, especially 1 to 10 parts by weight, based on 100 parts by weight of component A and component B combined. The amount of component D is more preferably 0.5 to 12 parts by weight, especially 1 to 10 parts by weight, based on 100 parts by weight of component A and component B combined. The total amount of component C and component D is preferably 3 to 16 parts by weight, more preferably 4 to 13 parts by weight, especially not less than 7 parts by weight but not more than 12 parts by weight, based on 100 parts by weight of component A and component B combined. The component D/component C ratio by weight is preferably 80/20 to 20/80, more preferably 70/30 to 30/70, especially 49/51 to 30/70.

For producing the thermoplastic resin composition according to the present invention, component C or component D are dispersed in component A thermoplastic resin forming the island phase to prepare an intermediate composition X, and separately from the above, component C or component D are also dispersed in component B thermoplastic resin forming the sea phase to prepare an intermediate composition Y. Then these intermediate compositions X and Y are mixed, or component B thermoplastic resin, component D and other optional components are mixed with intermediate composition X, and the obtained mixture is melted and kneaded to give the objective thermoplastic resin composition. Such melting and kneading provides a resin composition having an island-and-sea micro structure.

The weight-average particle size of the island phase is preferably not less than 3 μm for improving mechanical strength and moldability. Said melting and kneading causes a small portion of component C to pass into component B thermoplastic resin while forcing some of component D to shift into component A thermoplastic resin, but preferably not less than 70% by weight of component C is allowed to exist in the island phase while not less than 70% by weight of component D is allowed to exist in the sea phase.

For dispersing component C in component A thermoplastic resin and dispersing component D in component B thermoplastic resin, it is possible to use, for example, the following methods: (1) Predetermined amounts of resin and conductive carbon black are mixed, and the mixture is melted and kneaded by a proper melting and kneading machine such as single-screw extruder, multiple-screw extruder, Banbury mixer, roll mill, Brabender Plastogram, etc., and then granulated; (2) The said components are added to a suitable solvent, for example, a hydrocarbon such as hexane, heptane, benzene, toluene, xylene, etc., or a derivative thereof, and the dissolved components are mixed with each, or the dissolved components are mixed with the undissolved components in a suspended state. The methods available for the above purpose are not limited to those mentioned above. From the industrial point of view, the above-mentioned method (1) (melting and kneading method) is preferred. In this melting and kneading method (1), preferably a masterbatch with a high content of conductive carbon black is prepared previously, and this masterbatch is melted and kneaded with thermoplastic resins, as it is thereby possible to obtain a thermoplastic resin composition having conductive carbon black dispersed uniformly therein.

In the thermoplastic resin composition according to the present invention, various types of other resin additives can be blended within limits not affecting the purpose and effect of the present invention. The resin additives that can be blended include colorant, plasticizer, lubricant, thermal stabilizer, light stabilizer, ultraviolet absorber, filler, foaming agent, flame retardant, anticorrosive agent, etc. These resin additives are preferably blended in the final step of the preparation process of the thermoplastic resin composition according to the present invention.

The thermoplastic resin composition according to the present invention is particularly suited for use as a molding material for the articles which are required to have conductivity and/or antistatic properties, such as OA equipment, electronic devices, conductive packaging parts, antistatic packaging parts, and automobile parts to be coated by electrostatic coating. For producing these articles, it is possible to use the conventional thermoplastic resin molding methods such as injection molding, blow molding, extrusion molding, sheet forming, thermoforming, rotational molding, laminate molding, etc.

As explained above in detail, the present invention can produce the following notably advantageous effects, and its industrial utility value is very great.

1. Since the thermoplastic resin composition according to the present invention is provided with an island-and-sea micro structure by combining two different types of thermoplastic resin, the composition is improved in molding workability with no serious compromise in fluidity.
2. Since the thermoplastic resin composition according to the present invention has an island-and-sea micro structure comprising a combination of two different types of thermoplastic resin, with component C being contained in the island phase and component D in the sea phase, the molded articles obtained from this resin composition are high in mechanical strength such as heat resistance and impact strength.

3. Since the thermoplastic resin composition according to the present invention has an island-and-sea micro structure comprising a combination of two different types of thermoplastic resin, with component C being contained in the island phase and component D in the sea phase, the molded articles obtained from this thermoplastic resin have excellent conductivity and antistatic properties and are very useful for many applications where conductivity and antistatic properties are needed.

EXAMPLES

The present invention is further illustrated by the following examples, but it is to be understood that the scope of the present invention is not limited by these examples in any way. In the examples shown below, the specific properties of the components used are as described below. Also, in the following Examples and Comparative Examples, the shown amounts of the components blended are parts by weight, and the evaluation tests on the obtained compositions were conducted in the manner described below.

Component A thermoplastic resin:

(A-1) PC: poly-4,4-isopropylidenediphenyl carbonate having a viscosity-average molecular weight of 21,000 (abbreviated as PC)

(A-2) PPE: poly-2,6-dimethyl-1,4-phenylene ether having an intrinsic viscosity (measured in chloroform at 30° C.) of 0.40 dl/g (abbreviated as PPE)

(A-3) SEBS: hydrogenated styrene-butylene-styrene block copolymer (Kraton G1650 produced by Kraton Polymers Japan Ltd.) (abbreviated as SEBS)

(A-4) ABS: ABS resin with a butadiene content of 17 wt % (AT-05 produced by Nippon A & L Inc) (abbreviated as ABS)

(A-5) HIPS: High impact polystyrene with a butadiene content of 9 wt % (Diarex HT478 produced by A & M Styrene Co., Ltd.)

Component B Thermoplastic Resin:

(B-1) Polyamide: polyamide 6 having a relative viscosity (measured in 98% sulfuric acid at 23° C.) of 2.5 dl/g (abbreviated as PA6)

(B-2) Polyester: polybutylene terephthalate having an intrinsic viscosity of 1.1 dl/g (measured by dissolving this resin in a 1:1 (by weight) mixed solution of phenyl and tetrachloroethane to a concentration of 1 wt % at 30° C.) (abbreviated as PBT)

(B-3) Polyamide 66: Amiran 3000 produced by Toray Industries, Inc., having a relative viscosity (measured in 98% sulfuric acid at 23° C.) of 2.4 dl/g (B-4) Polyethylene terephthalate: Dianite PA200 produced by Mitsubishi Rayon Co., Ltd.

(B-5) PP: Novatec BC5D produced by Japan Polychem Corporation.

Components D-1 and D-2 (Conductive Carbon Black):

(D-1) Carbon black: carbon black with a specific surface area of 1,270 $m^2/g$ and a DBP oil absorption of 495 ml/100 g (Ketchen black 600JD produced by Lion Corp.)

(D-2) Carbon black: carbon black with a specific surface area of 800 $m^2/g$ and a DBP oil absorption of 360 ml/100 g (Ketchen black EC produced by Lion Corp.)

Components C-1 and C-2, D-3 and D-4 (carbon black or hollow carbon fibril):

(C-1) Carbon black: acetylene black (produced by Lion Corp.) with a specific surface area of 76 $m^2/g$ and a DBP oil absorption of 212 ml/100 g.

(C-2) Carbon black: general purpose carbon black with a specific surface area of 28 $m^2/g$ and a DBP oil absorption of 65 ml/100 g (SRF Carbon produced by Lion Corp.)

(D-3) Component: masterbatch containing 85 wt % of polybutylene terephthalate and 15 wt % of hollow carbon fibrils (Graphite Fibril BN) having an outer diameter of 15 nm, an inner diameter of 5 nm and a length of 100 to 10,000 nm (PBT/15BN produced by Hyperion Catalysis International, Inc.)

(D-4) Component: masterbatch containing 80 wt % of polyamide 6 and 20 wt % of the said Graphite Fibril BN (PA/20BN produced by Hyperion Catalysis International, Inc.)

Others:

Organic peroxide: Perkadox (dialkyl peroxide) produced by Kayaku Akuzo Co., Ltd., Maleic anhydride: commercially available reagent (first class grade)

(1) MFR (unit: g/10 min): Measured at 280° C. under a load of 5 kg according to JIS K7219.

(2) Bending modulus (unit: MPa): Bending test was conducted according to ASTM D790.

(3) Izod impact strength (unit: J/m): Measured with 3.2 nm thick notched test pieces according to ASTM D256.

(4) Volume resistivity (unit: Ωcm): Using an injection molding machine (Model IS-150 mfd. by Toshiba Machinery Co., Ltd.; clamping force=150 tons), a flat plate (150×150×3 mm) was molded at a cylinder temperature of 280° C. and a mold temperature of 80° C. and evaluated in the following way. Both ends of the flat plate in its longitudinal direction (the resin flowing direction during molding) were coated with a silver paste and, after drying at room temperature, resistivity (RL) was measured by a tester. Volume resistivity was calculated from the formula: RL×AL/L (AL: sectional area of the test piece; L: length of the test piece).

<Preparation of Intermediate Composition X>

The components shown in Table 1 were weighed out at the rates shown in the same table and uniformly mixed by a tumbling mixer, and the obtained mixture was melted and kneaded by a twin-screw extruder (30 mmφ) at a cylinder temperature of 280° C. and a screw speed of 250 rpm, and pelletized.

<Preparation of Intermediate Composition Y>

The components shown in Table 2 were weighed out at the rates shown in the same table and uniformly mixed by a tumbling mixer, and the obtained mixture was melted and kneaded by a twin-screw extruder (30 mmφ) at a cylinder temperature of 280° C. and a screw speed of 250 rpm, and pelletized.

TABLE 1

| Intermediate composition X (weight part) | X1 | X2 | X3 | X4 | X5 | X6 | X7 | X8 | X9 | X10 | X11 | X12 | X13 |
|---|---|---|---|---|---|---|---|---|---|---|---|---|---|
| PC (A-1) | | 30 | | | | 30 | | | | | | | |
| PPE (A-2) | 30 | | 30 | 30 | 30 | | 10 | | | | | 30 | 30 |
| SEBS (A-3) | 10 | | 10 | 10 | 10 | | 30 | 22 | | | | | 10 |
| ABS (A-4) | | | | | | | | | 30 | 30 | | | |
| HIPS (A-5) | | | | | | | | | | | 30 | | |
| Carbon black (C-1) | 3 | 3 | | | | | | | | | | | 5 |
| Carbon black (C-2) | | | 3 | | | 3 | 3 | 3 | | 3 | 3 | | |
| Carbon black (D-1) | | | | 3 | | | | | 3 | | | 3 | |
| Carbon black (D-2) | | | | | | | | | | | | | |
| hollow carbon fibril (D-3) | | | | | | | | | | | | | |
| hollow carbon fibril (D-4) | | | | | | | | | | | | | |
| Organic peroxide | | | | | | | 0.1 | 0.1 | | 0.1 | | | |
| Maleic anhydride | 1 | | 1 | 1 | 1 | | 1 | 1 | | 1 | | | 1 |

TABLE 2

| Intermediate composition Y (weight part) | Y1 | Y2 | Y3 | Y4 | Y5 | Y6 | Y7 | Y8 | Y9 | Y10 | Y11 |
|---|---|---|---|---|---|---|---|---|---|---|---|
| PA6 (B-1) | 30 | | | 30 | 30 | | 30 | | | 30 | |
| PBT (B-2) | | 30 | | | | 30 | | | | | |
| PA66 (B-3) | | | 30 | | | | | | | | |
| PET (B-4) | | | | | | | | | 30 | | |
| PP (B-5) | | | | | | | | 30 | | | 30 |
| Carbon black (C-1) | | | 2 | | 2 | 2 | | | | | |
| Carbon black (C-2) | | | | | | | 2 | 2 | 2 | | |
| Carbon black (D-1) | 2 | 3 | | | | | | | | 2 | 3 |
| Carbon black (D-2) | | | | 2 | | | | | | | |
| hollow carbon fibril (D-3) | | | | | | | | | | | |
| hollow carbon fibril (D-4) | | | | | | | | | | | |
| Organic peroxide | | | | | | | | | | | |
| Maleic anhydride | | | | | | | | 0.3 | | 0.3 | |

Examples 1 to 16

Intermediate composition X, intermediate composition Y, component A, component B and additive components were weighed out at the rates shown in Table 5 and mixed uniformly by a tumbling mixer, and the obtained mixtures were melted and kneaded by a twin-screw extruder (30 mmϕ) at a cylinder temperature of 280° C. and a screw speed of 150 rpm, and pelletized to prepare the samples of thermoplastic resin composition according to the present invention. These samples of thermoplastic resin composition were molded into test pieces by an injection molding machine (mfd. by Sumitomo Nestal Co., Ltd.; clamping force=75 tons) at a cylinder temperature of 280° C. and a mold temperature of 80° C., and the test pieces were subjected to the evaluation tests. The test piece used for measuring volume resistivity was as described above. The type and ratio (wt %) of the resin having an island-and-sea micro structure, the type of carbon black, and the type and ratio (wt %) of the resin phase containing carbon black were checked. The evaluation results are shown in Table 3.

Comparative Example 1

The same procedure as defined in Example 1 was conducted except that carbon black having a small specific surface area (component C) was blended in the sea phase while blending carbon black having a large specific surface area (component D) in the island phase as shown in Table 3 to obtain a mixture, and this mixture was melted and kneaded by a twin-screw extruder and pelletized. A test piece was molded from the pellets by injection molding and subjected to the same evaluation tests as conducted in Example 1. The evaluation results are shown in Table 3.

Comparative Example 2

Pellets and a test piece were obtained by conducting the same procedure as defined in Comparative Example 1 except that no carbon black was blended in the island phase, and the test piece was subjected to the evaluation tests to obtain the results shown in Table 3.

Comparative Example 3

Pellets and a test piece were obtained by conducting the same procedure as defined in Comparative Example 1 except that no carbon black was blended in the sea phase, and the test piece was subjected to the evaluations tests to obtain the results shown in Table 3.

Comparative Example 4

Pellets and a test piece were obtained by conducting the same procedure as defined in Comparative Example 1 except that no carbon black was blended in the island phase, and the test piece was subjected to the evaluation tests to obtain the results shown in Table 3.

Comparative Example 5

The same procedure as defined in Example 1 was conducted except that component C was not blended and component D alone was blended in the sea phase as shown in Table 3 to obtain a mixture, and this mixture was melted and kneaded by a twin-screw extruder and pelletized. A test piece was molded from the pellets and subjected to the same evaluation tests as conducted in Example 1. The evaluation results are shown in Table 3.

Comparative Example 6

Pellets and a test piece were obtained by conducting the same procedure as defined in Comparative Example 5 except that component C was blended in the sea phase but hollow carbon fibrils (component D) were not blended as shown in Table 3, and the test piece was subjected to the evaluation tests to obtain the results shown in Table 3.

Comparative Example 7

Pellets and a test piece were obtained by conducting the same procedure as defined in Comparative Example 5 except that neither component C nor component D were blended, and the test piece was subjected to the evaluation tests to obtain the results shown in Table 3.

TABLE 3

| Composition | Example 1 | Example 2 | Example 3 | Example 4 |
|---|---|---|---|---|
| Intermediate composition X or Y wt % | X1 44 | X2 33 | X2 33 | X3 44 |
| Intermediate composition X or Y wt % | Y1 32 | Y2 33 | X9 33 | Y1 32 |
| PA6 (B-1) wt % | 24 | | | 24 |
| PBT (B-2) wt % | | 34 | | |
| PP (B-5) wt % | | | | |
| PC (A-1) wt % | | | | |
| ABS (A-3) wt % | | | 34 | |
| hollow carbon fibril (C-3) wt % | | | | |
| hollow carbon fibril (C-4) wt % | | | | |
| Morphology Component constituting sea phase (wt %) | PA6 (54) | PBT (64) | ABS (64) | PA (54) |
| Component constituting island phase (wt %) | PPE/SEBS (30/10) | PC (30) | PC (30) | PPE/SEBS (30/10) |
| Carbon black (C) (wt %) | Island phase (3) | Island phase (3) | Island phase (3) | Island phase (3) |
| Carbon black (D) and/or hollow carbon fibril (wt %) | Sea phase (2) | Sea phase (3) | Sea phase (3) | Sea phase (2) |
| MFR (g/10 min) | 30 | 16 | 90 | 42 |
| Bending modulus (MPa) | 2560 | 2660 | 2410 | 2490 |
| Izod (J/m) | 210 | 190 | 70 | 270 |
| Volume resistivity (Ωcm) | $1 \times 10^5$ | $3 \times 10^6$ | $7 \times 10^7$ | $1 \times 10^5$ |

| Composition | Example 5 | Example 6 | Example 7 | Example 8 |
|---|---|---|---|---|
| Intermediate composition X or Y wt % | X1 44 | X3 44 | X6 33 | X7 44.1 |
| Intermediate composition X or Y wt % | Y4 32 | | | Y1 32 |
| PA6 (B-1) wt % | 24 | 46 | | 23.9 |
| PBT (B-2) wt % | | | 57 | |
| PP (B-5) wt % | | | | |
| PC (A-1) wt % | | | | |
| ABS (A-3) wt % | | | | |
| hollow carbon fibril (C-3) wt % | | | | 10 |
| hollow carbon fibril (C-4) wt % | | | 10 | |
| Morphology Component constituting sea phase (wt %) | PA (54) | PA (54) | PBT (65.5) | PA (53.9) |
| Component constituting island phase (wt %) | PPE/SEBS (30/10) | PPE/SEBS (30/10) | PC(30) | PPE/SEBS (10/30) |
| Carbon black (C) (wt %) | Island phase (3) | Island phase (3) | Island phase (3) | Island phase (3) |
| Carbon black (D) and/or hollow carbon fibril (wt %) | Sea phase (2) | Sea phase (2) | Sea phase (1.5) | Sea phase (2) |
| MFR (g/10 min) | 41 | 28 | 15 | 21 |
| Bending modulus (MPa) | 2610 | 2480 | 2600 | 1300 |
| Izod (J/m) | 180 | 280 | 230 | 720 |
| Volume resistivity (Ωcm) | $6 \times 10^6$ | $8 \times 10^5$ | $2 \times 10^4$ | $3 \times 10^6$ |

| Composition | Example 9 | Example 10 | Example 11 | Example 12 |
|---|---|---|---|---|
| Intermediate composition X or Y wt % | X8 26.1 | X10 34.1 | X11 33 | Y3 32 |
| Intermediate composition X or Y wt % | Y1 32 | Y1 32 | X12 33 | Y1 32 |
| PA6 (B-1) wt % | 41.9 | 33.9 | | 36 |
| PBT (B-2) wt % | | | | |
| PP (B-5) wt % | | | | |
| PC (A-1) wt % | | | 34 | |
| ABS (A-3) wt % | | | | |
| hollow carbon fibril (C-3) wt % | | | | |
| hollow carbon fibril (C-4) wt % | | | | |
| Morphology Component constituting sea phase (wt %) | PA (71.9) | PA6 (63.9) | PPE (64) | PA6 (66) |
| Component constituting island phase (wt %) | SEBS (22) | ABS (30) | HIPS (30) | PA66 (30) |
| Carbon black (C) (wt %) | Island phase (3) | Island phase (3) | Island phase (3) | Island phase (2) |
| Carbon black (D) and/or hollow carbon fibril (wt %) | Sea phase (2) | Sea phase (2) | Sea phase (3) | Sea phase (2) |
| MFR (g/10 min) | 68 | 59 | 10 | 108 |
| Bending modulus (MPa) | 1510 | 2110 | 2120 | 2520 |
| Izod (J/m) | 690 | 120 | 120 | 77 |
| Volume resistivity (Ωcm) | $2 \times 10^5$ | $1 \times 10^5$ | $4 \times 10^5$ | $6 \times 10^5$ |

| Composition | Example 13 | Example 14 | Example 15 | Example 16 |
|---|---|---|---|---|
| Intermediate composition X or Y wt % | Y9 32 | Y8 32.3 | X8 26.1 | X13 46 |
| Intermediate composition X or Y wt % | Y2 33 | Y1 32 | Y10 32.3 | Y11 33 |
| PA6 (B-1) wt % | | | 35.7 | 21 |
| PBT (B-2) wt % | 35 | | | |
| PP (B-5) wt % | | | 41.6 | |
| PC (A-1) wt % | | | | |
| ABS (A-3) wt % | | | | |
| hollow carbon | | | | |

TABLE 3-continued

| Composition | | | | |
|---|---|---|---|---|
| fibril (C-3) wt % | | | | |
| hollow carbon fibril (C-4) wt % | | | | |
| Morphology | | | | |
| Component constituting sea phase (wt %) | PBT (65) | PA6 (65.7) | PP (71.9) | PA6 (51) |
| Component constituting island phase (wt %) | PET (30) | PP (30) | SEBS (22) | PPE/SEBS (30/10) |
| Carbon black (C) (wt %) | Island phase (2) | Island phase (2) | Island phase (3) | Island phase (5) |
| Carbon black (D) and/or hollow carbon fibril (wt %) | Sea phase (3) | Sea phase (2) | Sea phase (2) | Sea phase (3) |
| MFR (g/10 min) | 199 | 78 | 80 | 27 |
| Bending modulus (MPa) | 2430 | 1810 | 1010 | 2770 |
| Izod (J/m) | 65 | 85 | 660 | 220 |
| Volume resistivity (Ωcm) | 7 × 10⁵ | 2 × 10⁵ | 5 × 10⁴ | 3 × 10⁴ |

| Composition | Comp. Example 1 | Comp. Example 2 | Comp. Example 3 | Comp. Example 4 |
|---|---|---|---|---|
| Intermediate composition X or Y wt % | X4 44 | X5 41 | X1 44 | |
| Intermediate composition X or Y wt % | Y5 32 | Y1 32 | | Y6 32 |
| PA6 (B-1) wt % | 24 | 27 | 56 | |
| PBT (B-2) wt % | | | | 38 |
| PP (B-5) wt % | | | | |
| PC (A-1) wt % | | | | 30 |
| ABS (A-3) wt % | | | | |
| hollow carbon fibril (C-3) wt % | | | | |
| hollow carbon fibril (C-4) wt % | | | | |
| Morphology | | | | |
| Component constituting sea phase (wt %) | PA6 (54) | PA6 (57) | PA6 (56) | PBT (68) |
| Component constituting island phase (wt %) | PPE/SEBS (30/10) | PPE/SEBS (30/10) | PPE/SEBS (30/10) | PC (30) |
| Carbon black (C) (wt %) | Sea phase (2) | None | Island phase (3) | Sea phase (2) |
| Carbon black (D) and/or hollow carbon fibril (wt %) | Island phase (3) | Sea phase (2) | None | None |
| MFR (g/10 min) | 38 | 33 | 45 | 18 |
| Bending modulus (MPa) | 2500 | 2440 | 2400 | 2580 |
| Izod (J/m) | 100 | 120 | 200 | 170 |
| Volume resistivity (Ωcm) | 7 × 10⁸ | 6 × 10⁶ | 1 × 10⁹ ≦ | 8 × 10⁸ |

| Composition | Comp. Example 5 | Comp. Example 6 | Comp. Example 7 |
|---|---|---|---|
| Intermediate composition X or Y wt % | X5 41 | X5 41 | X5 41 |
| Intermediate composition X or Y wt % | | Y7 32 | |
| PA6 (B-1) wt % | 49 | 27 | 59 |
| PBT(B-2) wt % | | | |
| PP (B-5) wt % | | | |
| PC (A-1) wt % | | | |
| ABS (A-3) wt % | | | |
| hollow carbon fibril (C-3) wt % | | | |
| hollow carbon fibril (C-4) wt % | | 10 | |
| Morphology | | | |
| Component constituting sea phase (wt %) | PA6 (57) | PA6 (57) | PA6 (59) |
| Component constituting island phase (wt %) | PPE/SEBS (30/10) | PPE/SEBS (30/10) | PPE/SEBS (30/10) |
| Carbon black (C) (wt %) | None | Sea phase (2) | None |
| Carbon black (D) and/or hollow carbon fibril (wt %) | Sea phase (2) | None | None |
| MFR (g/10 min) | 33 | 33 | 55 |
| Bending modulus (MPa) | 2310 | 2440 | 2310 |
| Izod (J/m) | 150 | 120 | 200 |
| Volume resistivity (Ωcm) | 4 × 10⁵ | 1 × 10⁹ ≦ | 1 × 10⁹ ≦ |

The following facts are known from Table 3.

(1) The resin compositions embodying the present invention have an island-and-sea micro structure constituted by a combination of different types of thermoplastic resin, with conductive carbon black (component C) being blended in the island phase and conductive carbon black (component D) or hollow carbon fibrils (component D) being blended in the sea phase, so that they have excellent fluidity, mechanical strength and volume resistivity. (Examples 1 to 15).

(2) Even if an island-and-sea micro structure is constituted by a combination of different types of thermoplastic resin, the composition is poor in impact strength and volume resistivity if conductive carbon black of component C blended in the island phase alone but conductive carbon black is not blended in the sea phase. (Comparative Example 3).

(3) Also, even if an island-and-sea micro structure is constituted by a combination of different types of thermoplastic resin, the composition is poor in volume resistivity if component C is blended in the sea phase alone but component D is not blended in the island phase (Comparative Examples 4 and 6).

(4) Further, even if an island-and-sea micro structure is constituted by a combination of different types of thermoplastic resin, the composition is poor in volume resistivity if neither component C nor component D is blended. (Comparative Example 7).

(5) In the resin composition of Comparative Example 1, component C is blended in the sea phase and component D is blended in the island phase, just contrary to the Examples of the present invention, so that this composition is poor in fluidity, impact strength and volume resistivity.

What is claimed is:

1. A thermoplastic resin composition comprising two different thermoplastic resins (component A and component B), conductive carbon black (component C), and conductive carbon black having a larger specific surface area than that of component C or hollow carbon fibril (component D), said thermoplastic resin composition having an island-and-sea micro structure constituted by component A and component B, component C existing mostly in the island phase, and component D existing mostly in the sea phase;
wherein component C has a specific surface area range from about 10 m²/g to about 600 m²/g; and component D has a specific surface area range from about 600 m²/g to about 1300 m²/g.

2. A thermoplastic resin composition according to claim 1, wherein the specific surface area of conductive carbon black of component C ranges from about 10 m²/g to about 450 m²/g, and the specific surface area of conductive carbon black of component D ranges from about 750 m²/g to about 1300 m²/g.

3. A thermoplastic resin composition according to claim 1, wherein component A is an amorphous thermoplastic resin and constitutes the island phase, and component B is a crystalline thermoplastic resin and constitutes the sea phase.

4. A thermoplastic resin composition according to claim 1, wherein component A is a polyphenylene ether resin, a polycarbonate resin, a polystyrene resin, an ABS resin, a polyolefinic elastomer, a polystyrene-based elastomer, or a mixture thereof.

5. A thermoplastic resin composition according to claim 1, wherein component B is a polyamide resin, a polyester resin, a polyolefinic resin, a polyphenylene sulfide resin, or a mixture thereof.

6. A thermoplastic resin composition according to claim 1, wherein component A is a polycarbonate resin and component B is a polyolefinic resin, or component A is a polyphenylene ether resin and component B is a polyamide resin.

* * * * *